July 28, 1942.    S. R. NAYSMITH    2,291,491
COMBINED WIRING CONDUIT AND FLUORESCENT LAMP FIXTURE
Filed Jan. 31, 1941
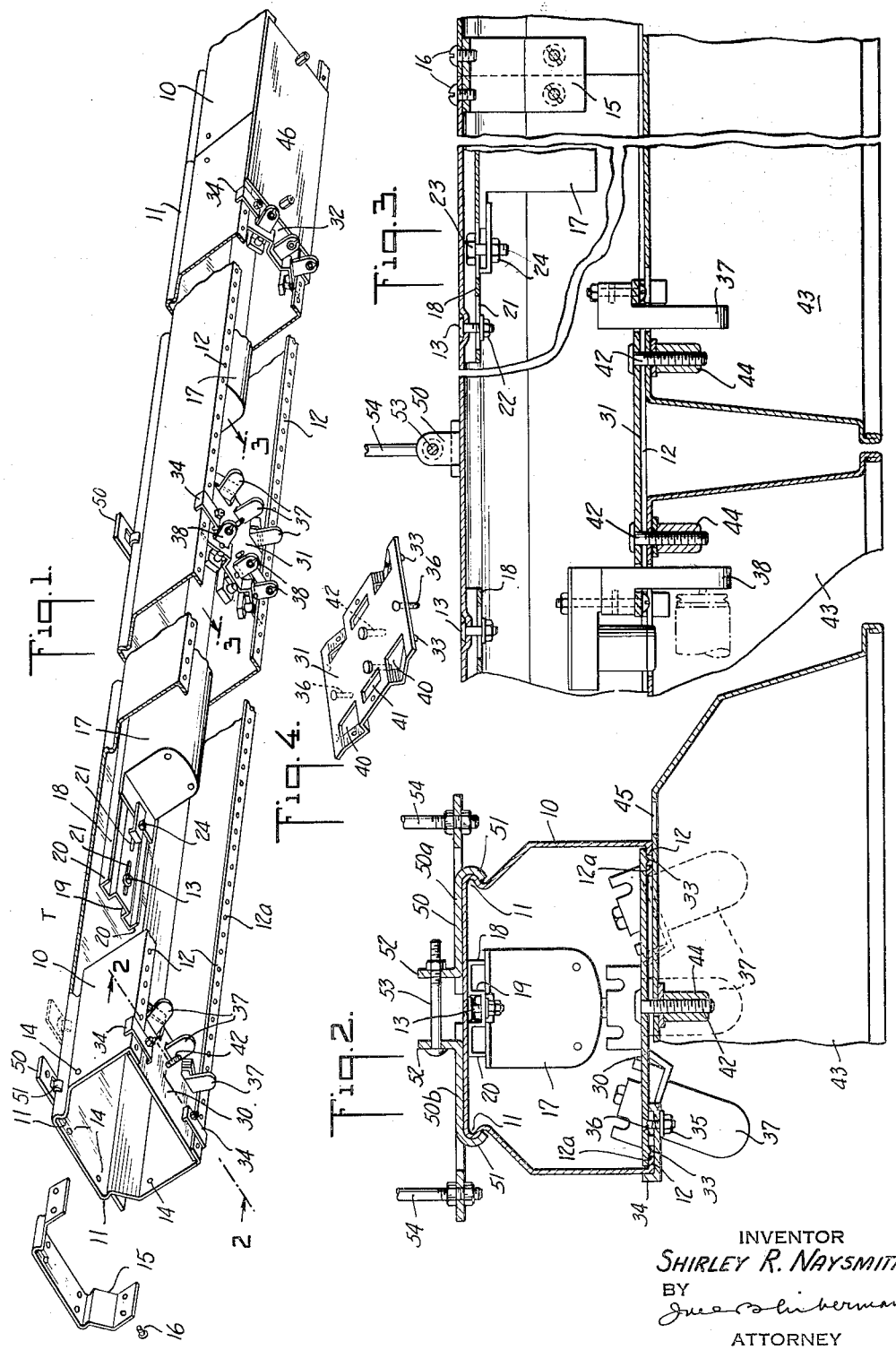
INVENTOR
SHIRLEY R. NAYSMITH
BY
ATTORNEY

UNITED STATES PATENT OFFICE 2,291,491

COMBINED WIRING CONDUIT AND FLUORESCENT LAMP FIXTURE

Shirley R. Naysmith, Meriden, Conn., assignor to The Miller Company, Meriden, Conn., a corporation of Connecticut Application January 31, 1941, Serial No. 376,781

7 Claims. (Cl. 240—78)

The present invention relates to combined wiring conduits and fluorescent lamp fixtures, and is more particularly directed toward structures suitable for use in the installation of a line of lighting equipment over long areas.

Where it has been necessary to light long narrow areas, or a plurality of contiguous long narrow areas, it has been customary to install permanent wiring and spaced outlets to which individual fixtures or luminaires would be connected. Where such wiring has been installed for fixtures of the incandescent lamp type and a change to fluorescent lighting equipment is desired, the spacing of the outlets restricts the location of the fluorescent units, or it is necessary to move the outlets or add outlets at considerable expense. In new installations the provision of permanent wiring and outlets for each fixture is a substantial portion of the cost of the complete lighting equipment layout and apparatus.

In my copending application Serial No. 376,780 filed concurrently herewith, I have discussed an improved layout whereby the wiring expense is substantially reduced and have illustrated apparatus suitable for use therein, this apparatus having long sectionalized wiring conduits through which a very large portion of the wiring is passed, and these conduits support the fluorescent lighting equipment, including auxiliaries, lamps and reflectors.

The present invention relates to such apparatus and more particularly to forms thereof wherein the wiring conduits may be manufactured shipped and installed without the lighting apparatus or auxiliaries, and wherein the lighting apparatus and auxiliaries of various ratings and distribution may be installed at random locations along the wiring conduit.

According to the present invention it is possible to make large installations of lighting equipment in a manner to save repeated handling of equipment, reshipping it and excessive transportation charges. It has been usual for the manufacturer of lighting equipment for similar purposes to assemble the structure, the auxiliaries, the lamp holders or sockets and the reflectors, and to completely or partly wire them. Then the fixtures are packed for shipment to the place of installation. All this involves a considerable expense for freight and handling, and brings the fixture into a high freight rate classification.

In practicing the present invention it is possible to ship the trough in sections with its supports, the supports for the auxiliaries and for the sockets, and the reflectors from the factory, or factories, where they are made or warehoused, and to ship the auxiliaries, the lamp sockets or lamp holders, the wire, and the lamps from the factories where they are made or where they are warehoused. These shipments are at lower freight rates, and for lesser overall distances than where a complete factory assembly is required, and large savings can be made.

Other and further objects will appear as the description proceeds.

The accompanying drawing shows, for purposes of illustrating the present invention, an embodiment in which the invention may take form, it being understood that the drawing is illustrative of the invention rather than limiting the same.

In the drawing:

Figure 1 is a perspective view showing a wiring trough or conduit with parts broken away and parts removed for clearness;

Figure 2 is a vertical sectional view on the line 2—2 of Figure 1;

Figure 3 is a longitudinal sectional view on the line 3—3 of Figure 1; and

Figure 4 is a perspective view of a stiffening plate employed for supporting sockets.

The wiring trough T illustrated in the drawing is composed of a plurality of sections 10, 10 of sheet metal bent to trough-like cross section. These trough-like sections may be of any desired length depending upon convenience of manufacture, shipping and handling. As this dimension is in the neighborhood of 8 to 10 feet the sections of the trough are usually made up of such length as to be somewhat more than twice the length of the fluorescent lamp intended to be used, but this dimensional relation is not at all essential as the lamps and equipment can be mounted at random positions along the trough.

The troughs have longitudinally extending beads 11, 11 at the top and inwardly extending flanges 12, 12 at the bottom. These flanges have holes 12a punched in them at regular distances, preferably one inch apart. The back of the trough is provided with welding bolts 13 spaced at intervals throughout the entire length of all the sections so that auxiliaries may be supported wherever desired. The ends of the trough sections are provided with holes 14 and the trough sections are fastened together by coupling elements 15 and screws 16.

Lamp auxiliaries of suitable type are indicated at 17. These auxiliaries are secured to a ballast mounting strap, such as indicated at 18. This strap is bent to form a U-shaped central portion indicated at 19 and marginal depending flanges 20, 20. The U-shaped portion is slotted, as indicated at 21. The welding bolts 13 extend through certain of the slots 21 so that the ballast mounting strap may be fastened in place by nuts 22 threaded on to the welding bolts. The central U-shaped portion 19 accommodates the heads 23 of bolts 24, these bolts being used for securing the ballasts or auxiliaries in position. Owing to the provision of a multiplicity of welding bolts 13 at various locations along the trough sections and the configuration given the mounting strap it is possible to secure any type of ballast or auxiliary required at any convenient position along the length of the entire trough, so that these auxiliaries may be placed near the sockets for the lamps to be serviced.

Socket mounting plates 30, 31, 32 are indicated in the drawing. These socket mounting plates are receivable within the wiring trough and rest on the flanges 12, 12 as will be apparent from the drawing. They are provided with indentations 33, 33 adapted to fit the holes 12a in the flanges and definitely locate the socket mounting plates at the proper spacing lengthwise of the wiring channel. After the socket mounting plates have been located at the proper spacing they are secured in place by clamps 34, 34 fitting the outside of the wiring channel and by nuts 35 carried on bolts 36 welded to the socket mounting plates. It will thus be seen that these socket mounting plates stiffen the wiring channel at intervals.

As illustrated in the drawings the socket plate 30 carries three lamp sockets or lamp holders 37. The socket mounting plate 31 is twice the width of the socket mounting plate 30 and is designed to carry two sets of lamp sockets or lamp holders, as indicated at 38 and 37. The lamp holders 38 will generally be of the type having starters, while the lamp holders 37 will not have the starters. In order that the sockets may be spaced the proper distance apart, and yet have the wiring channel narrow, the plates 30, 31 and 32 are provided with socket receiving openings such as indicated at 40 and 41, and the material adjacent the outer openings 40, 40 is bent into an oblique position so that the outer sockets are at an angle.

The plates indicated in the drawing are those where three lamps are to be used side by side in each adjacent portion of the wiring channel. If only two lamps are to be used the central socket would be omitted, and if only one lamp were to be used the two outside sockets would be omitted. These sockets would, of course, be made according to the size of the lamp to be used and would be accurately spaced to receive these lamps. In order that the spacing may be proper the socket mounting plates are designed so that when spaced apart a multiple of the one inch length, as determined by the holes 12a, the sockets themselves will be at the proper spacing to fit the lamps. Where three lamps are employed side by side it is generally desirable to have another three lamp section adjacent, and in this case the auxiliaries for operating one lamp of each of the three lamp sections are mounted between the auxiliaries used for operating the other two lamps of each three lamp section.

The socket mounting plates are also provided with downwardly extending, centrally located bolts 42 so that reflectors 43 may be secured in position by nuts 44. These reflectors are apertured to receive the various lamp sockets and starters. They cover the openings in the wiring trough between the stiffening plates which carry the lamp sockets and may, if desired, be provided with holes 45 in the top to permit some of the light to escape upwardly. Where no lighting equipment is required along any particular length of the wiring trough, plain covers 46 may be secured below the bottom of the wiring trough by using suitably spaced stiffening plates similar to the socket supporting plates.

The beads 11, 11 along the top of the wiring channel are utilized to support hanger straps 50. These straps are preferably made in two parts 50a and 50b, each provided with downwardly bent hooks 51, 51 to engage the beads and with upwardly extending ears 52, 52 to receive a clamping bolt 53. The two parts strap 50 can be secured to the wiring channel anywhere along its length. The strap 50 may be used to support the trough in any suitable manner. It is here shown as being connected with two hanger rods 54. It may, however, be used with cables and other devices as indicated in the application above referred to.

The various parts required to make up the wiring channel, its supports, coupling straps, together with the mounting strap for the auxiliaries and the socket supporting plates may be manufactured at a plant equipped for making this type of material and shipped directly to the point of installation, or may be warehoused at suitable points. The reflectors which require different manufacturing operations may be made at factories equipped for this work and similarly shipped and warehoused. The auxiliaries and sockets may be shipped directly from the manufacturers of these parts to the site where the complete apparatus is to be installed. The wiring troughs may be completely installed before the wiring is put in, then the wiring may be passed up into the wiring troughs, secured in position and the wiring for the auxiliaries and lamp sockets completed so that service may be had. The reflectors and flat covers may be installed when convenient.

Inasmuch as the wiring of the auxiliaries and lamp sockets may follow conventional circuit arrangements the same is omitted from the drawing for clearness.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A wiring conduit for fluorescent lighting equipment comprising a plurality of sheet metal sections of inverted trough shaped cross section, each having inwardly extending stiffening flanges of substantial width, interiorly disposed connecting straps bridging the joints between adjacent sections and fixedly secured to the sides and tops of the sections to hold the sections in alignment both horizontally and laterally and form a trough, relatively short horizontal plates secured to the tops of the flanges and disposed at intervals along the trough whereby elongated spaces are provided between adjacent plates corresponding to lamp length, fluorescent lamp sockets supported near the edges of the plates and projecting downwardly from the trough, fluorescent lamp auxiliaries supported from the top of the trough and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, and covers secured to adjacent plates to form an enclosing passage for the wiring.

2. A wiring conduit such as claimed in claim 1, wherein the plates carry the lamp sockets and are placed at random positions along the trough so that the lamp positions along the conduit and lamp lengths accommodated may be independent of length of the sections.

3. A wiring conduit for fluorescent lighting equipment comprising a plurality of sheet metal sections of inverted trough shaped cross section, each having inwardly extending stiffening flanges of substantial width, interiorly disposed connecting straps bridging the joints between adjacent sections and fixedly secured to the sides and tops of the sections to hold the sections in alignment both horizontally and laterally and form a trough, relatively short horizontal plates immediately above the flanges and disposed at intervals along the trough whereby elongated spaces are provided between adjacent plates corresponding to lamp length, means for attaching said plates to the trough to form stiffening members for the trough, fluorescent lamp sockets carried by the plates near the edges thereof and projecting downwardly from the conduit, fluorescent lamp auxiliaries supported from the top of the trough and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, and covers secured to adjacent plates to form an enclosing passage for the wiring.

4. A wiring conduit such as claimed in claim 3, wherein the plates have holes through which the sockets extend.

5. A wiring conduit such as claimed in claim 3, wherein the plates have oblique apertured portions on opposite sides of the center line thereof and through which the sockets extend.

6. A wiring conduit for fluorescent lighting equipment comprising a plurality of sheet metal sections of inverted trough shaped cross section, each having inwardly extending stiffening flanges of substantial width, interiorly disposed connecting straps bridging the joints between adjacent sections and fixedly secured to the sides and tops of the sections to hold the sections in alignment both horizontally and laterally and form a trough, each section having lower vertical side walls above the flanges, a flat top wall narrower than the side wall spacing, a longitudinally extending head along each edge of the top wall and having a downwardly facing element, and upper sloping side walls connecting each side wall and the downwardly facing element of the corresponding bead whereby two continuous, reentrant, laterally opening grooves are formed lengthwise of the conduit, relatively short horizontal plates immediately above the flanges and disposed at intervals along the trough whereby elongated spaces are provided between adjacent plates corresponding to lamp length, means for attaching said plates to the trough to form stiffening members for the trough, fluorescent lamp sockets supported near the edges of the plates and projecting downwardly from the conduit, fluorescent lamp auxiliaries supported from the top of the trough and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, and covers secured to adjacent plates to form an enclosing passage for the wiring.

7. A wiring conduit for fluorescent lighting equipment comprising a plurality of sheet metal sections of inverted trough shaped cross section, each having inwardly extending stiffening flanges of substantial width, interiorly disposed connecting straps bridging the joints between adjacent sections and fixedly secured to the sides and tops of the sections to hold the sections in alignment both horizontally and laterally and form a trough, relatively short horizontal plates immediately above the flanges and disposed at intervals along the trough whereby elongated spaces are provided between adjacent plates corresponding to lamp length, means for attaching said plates to the trough to form stiffening members for the trough, fluorescent lamp sockets supported near the edges of the plates and projecting downwardly from the conduit, downwardly extending bolts spaced lengthwise of the top of the trough, straps of U-shaped cross section each having elongated slots through which two bolts extend, downwardly extending strap-carried bolts, fluorescent lamp auxiliaries secured to the latter mentioned bolts and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, and covers secured to adjacent plates to form an enclosing passage for the wiring.

SHIRLEY R. NAYSMITH.